Figure 1:
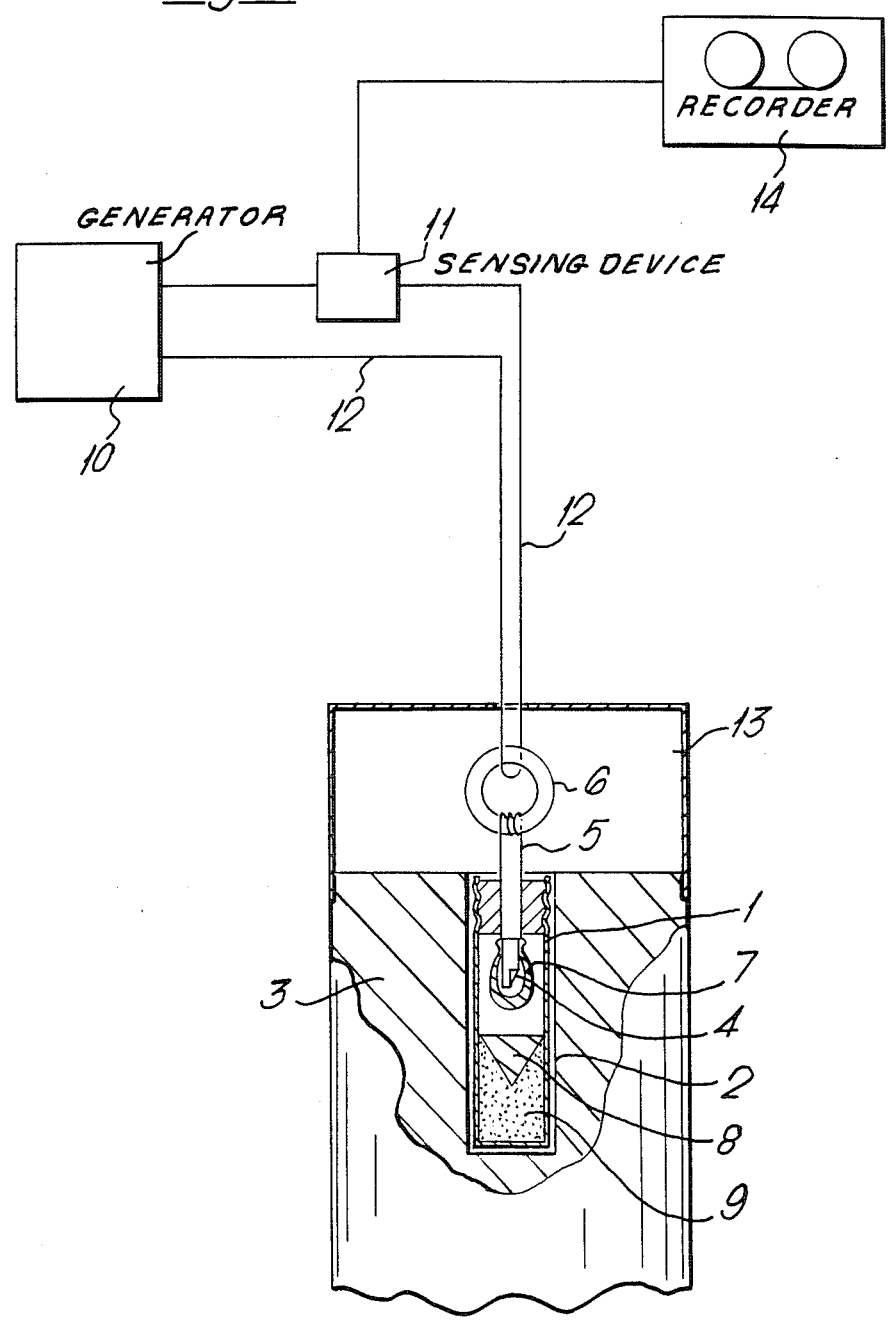

United States Patent [19]

Dixon et al.

[11] Patent Number: 4,782,911
[45] Date of Patent: Nov. 8, 1988

[54] SEISMIC RECORDING

[75] Inventors: Raymond M. Dixon, Dundonald; Alan G. King, Ardrossan; Stephen R. Thompson, Sedgefield, all of United Kingdom

[73] Assignee: Imperial Chemical Industries PLC, Victoria, Australia

[21] Appl. No.: 384,751

[22] Filed: Jun. 3, 1982

[30] Foreign Application Priority Data

Jun. 1, 1981 [GB] United Kingdom ............... 8116633

[51] Int. Cl.⁴ .............................................. G01V 1/00
[52] U.S. Cl. ..................................... 181/107; 367/55; 102/200
[58] Field of Search ..................... 367/41, 50, 55; 181/104, 103, 106, 107, 116, 108; 102/200, 206, 301; 116/209, DIG. 18; 73/598; 346/33 WL, 33 C

[56] References Cited

U.S. PATENT DOCUMENTS

| 2,189,741 | 2/1940 | Minton | 367/55 |
|---|---|---|---|
| 2,275,316 | 3/1942 | Ritzmann | 346/33 R |
| 2,331,623 | 10/1943 | Parr | 367/55 |
| 2,331,627 | 12/1943 | Petty | 367/55 |
| 2,411,339 | 11/1946 | Rolfes et al. | 102/206 |
| 2,470,846 | 5/1949 | deBoisblanc et al. | 367/55 |
| 2,612,772 | 10/1952 | McConnell | 73/598 |
| 2,660,716 | 11/1953 | McFarland | 367/55 |
| 2,741,179 | 4/1956 | Taylor et al. | 102/206 |
| 2,803,809 | 8/1957 | Tilley | 367/55 X |
| 2,844,211 | 7/1958 | Nickerson | 367/55 |
| 2,900,619 | 8/1959 | Montgomery | 367/55 |
| 3,040,660 | 6/1962 | Johnston | 102/206 |
| 3,521,483 | 7/1970 | Miller et al. | 73/598 |
| 4,324,310 | 4/1982 | Wener et al. | 181/106 X |

FOREIGN PATENT DOCUMENTS 2022222 12/1979 United Kingdom .
1590007 5/1981 United Kingdom .

Primary Examiner—Deborah L. Kyle
Assistant Examiner—Brian S. Steinberger
Attorney, Agent, or Firm—Cushman, Darby & Cushman

[57] ABSTRACT

A method and apparatus for indicating the time-break on a seismic record wherein the time-break is marked in response to the rupture of an electric circuit by the explosive charge used to generate the seismic waves. The preferred rupturable electric circuit is connected to the same energy source as the electric detonator used to initiate the explosive charge and the preferred electric detonator is one connected to a high frequency A.C. firing energy source through a transformer, the rupturable electric circuit being the primary or secondary circuit of the transformer.

The method is more accurate than the present method of marking the time-break at the initial application of current to the detonator.

6 Claims, 2 Drawing Sheets

SEISMIC RECORDING

This invention relates to a method of seismic recording using an explosive charge to generate the seismic signal and in particular to an improved method of indicating the time-break on a seismic record. The invention also includes an apparatus assembly for indicating the time break on a seismic record.

In the prospecting of geological formations using explosive charges, seismic waves are generated in the formations by an exploding charge and are reflected or refracted at rock layer interfaces. The reflected or refracted waves are detected at the earth's surface by geophones which convert the waves into electrical energy and this is used to make a permanent record, on photographic paper or magnetic tape, of the waves received at each geophone location. The seismic record indicates the time of generation of the seismic waves, i.e. the explosion of the charge, and the time of detection of each wave (seismic event) at the geophone. From a knowledge of the speed of the seismic wave through the earth, the depth of each subterranean rock interface can be calculated. For accurate calculation of the interface depths it is important that the exact instant of generation of the seismic wave, or a time accurately related thereto, should be recorded accurately as a reference time. This reference time is generally termed the 'time-break' of the record.

In the current method of seismic prospecting using an explosive charge as the seismic energy source the time-break indicated on the record is the time of application of electric current to the electric detonator used to ignite the explosive charge. However, even with special electric detonators designed for rapid bursting, there is a delay of about one millisecond between the application of the current and the bursting of the detonator, due mainly to the time required to heat the detonator heating wire element and fusehead priming composition to ignition temperature. This delay time is variable and consequently the time break indication is not a completely accurate reference point for the generation of the seismic wave.

It is an object of this invention to provide a method and apparatus for providing a more accurate indication of the time-break on a seismic record than the method currently used in seismic prospecting systems using explosives to generate seismic waves.

In accordance with this invention in a method of seismic recording wherein seismic waves are generated by means of an explosive charge and are subsequently recorded after reflection or refraction at subterranean rock layer interfaces the time-break on the seismic record is indicated by a method comprising locating a breakable portion of an electrical circuit in proximity to the explosive charge so that a circuit portion is broken by the explosion of the charge, detecting the time of occurrence of the circuit break and, in response thereto, making a mark of the seismic record to serve as the time-break.

In the preferred method of putting the invention into practice a current is passed in the electrical circuit during the explosion of the charge and the break in the circuit is detected by the cessation of current or a rapid rise in voltage across the broken circuit portion. The time difference between the explosion of the charge and the marking of the time-break on the record will depend on the time taken for the circuit to break and the additional time required for the detecting means to operate a marking device on the record. Using a circuit of insulated copper wire as used for standard electric blasting detonator leading wires with currently available electrical sensing devices the time break can be marked on the seismic record at about 100 microseconds after the explosion of the charge, i.e. in about one tenth of the time difference between the time break recorded from the application of current to the electric detonator and the explosion of the charge in the method used hitherto.

It is convenient and advantageous to explode the explosive charge by means of an electric detonator and to fire the detonator by passing current simultaneously through the detonator and the breakable electrical circuit from a common energy source. Thus in a convenient method the detonator firing circuit may be connected in parallel with a resistive portion of the breakable electrical circuit.

There is a present trend towards the use of electric detonators which are initiated by electromagnetically induced currents from an A.C. source. In such detonators the insulated leading wire from the detonator igniter element is looped as a secondary winding around a ring-shaped transformer core, usually a toroid, to which a firing lead wire from the A.C. source is electromagnetically coupled as a primary winding, the primary winding usually being coupled to several detonator igniter elements.

Transformer coupled detonator arrangements are shown, for example, in our United Kingdom patent specification No. GB 2 022 222A and are marketed under the trade name 'Magnadet' (Registered Trade Mark)'. These detonators give the advantages of protection against accidental firing by stray electric currents and static electricity because the secondary circuit through the detonator can be short and totally shielded, and since the transformer core is frequency selective, it can be designed to prevent firing of the detonator from high D.C. and low frequency A.C. currents (e.g. 50 Hz) and static discharge in the primary circuit. Moreover protection from electromagnetic radiation is also obtained because the aerial effect of the short secondary detonator circuit is insignificant and that of the primary is less than that of the directly connected seismic detonator currently used by a factor of at least the number of turns in the secondary winding of the transformer.

Electromagnetically coupled detonator arrangements are therefore preferred in the present invention for safety reasons, and with such arrangements the breakable portion of the electrical circuit may be arranged as a portion either of the secondary circuit or the primary circuit of the coupling transformer. Where the said breakable circuit portion is part of the primary circuit the current will flow in this portion until the explosion even if the ignition element is previously fused. In the preferred method the leading wires from the detonator igniter circuit are kept sufficiently short that the portion of the wire from the A.C. source serving as the primary winding on the transformer is broken by the explosion.

The apparatus assembly of the invention for indicating the time break on a record of a seismic signal generated by an explosive charge comprises an electrical circuit having a breakable circuit portion adapted in operation to be broken by the explosion of the explosive charge and electrical sensing means responsive to the breaking of said circuit portion for generating a signal to mark the time-break on the seismic record when the said circuit portion is broken.

Preferably the assembly comprises the electric detonator for igniting the explosive charge and means to connect the breakable electrical circuit and the detonator firing circuit to a common source of electrical energy. In such an arrangement the breakable circuit portion may comprise a resistive circuit portion shunt connected across the terminals of a resistive ignition element (usually a bridgewire) of the detonator. However, in a more preferred arrangement, the detonator igniter circuit is electromagnetically coupled to an A.C. firing source by means of a transformer core to which the conductor wires from the source and the detonator ignition element are electromagnetically connected as primary and secondary circuits respectively, the breakable electrical circuit portion preferably comprising a portion of the primary circuit although it may if desired comprise a portion of the secondary circuit. The transformer is advantageously a ring core through which the conductor wires from the A.C. source and the detonator ignition element are looped.

The electrical sensing means may conveniently comprise a current responsive device connected in series with the breakable electrical circuit, which device, on cessation of the current generates a signal to mark the time-break on the seismic record. Alternatively the sensing means may comprise a voltage responsive device shunt connected across the breakable circuit portion, which device, in response to the increased voltage consequent on the circuit break, generates a signal to mark the time-break.

When the breakable electrical circuit portion carries an alternating current as, for example, in the preferred assembly wherein the detonator igniter element is electromagnetically coupled to an A.C. source, the electrical sensing means may advantageously comprise a transformer core to which the breakable circuit portion is electromagnetically coupled as a primary circuit, a secondary winding on said transformer core and a pulse detector to detect the presence and cessation of the pulses induced in the secondary winding when firing energy is passed through the breakable circuit portion from the A.C. source during the explosion of the charge. A preferred pulse detector for sensing high frequency pulses as used for firing electromagnetically coupled detonators comprises a resistor-capacitor circuit connected via a rectifier to the secondary winding wherby the capacitor is charged by the induced pulses in the secondary winding, a voltage comparator to compare the capacitor voltage with a reference voltage and means responsive to the voltage comparator output to mark the time-break on the seismic record when the capacitor voltage falls below the reference voltage. The values of the resistor and capacitor may be chosen so as to control the capacitor voltage decay rate so that the voltage of the charged capacitor will not fall below the reference voltage during one pulse cycle but will fall below the reference voltage in a time interval not greatly exceeding one pulse cycle.

Figure 2:
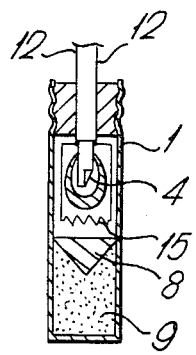
Figure 3:
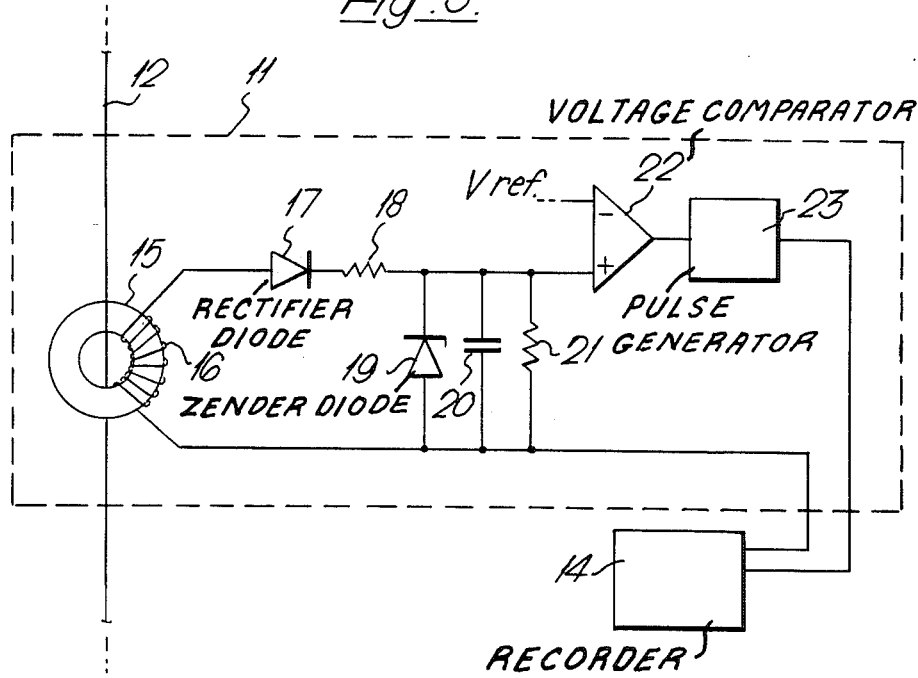

The invention is further illustrated by the embodiments which are hereinafter particularly described by way of example with reference to the accompanying drawings wherein FIG. 1 shows diagrammatically a circuit diagram including an apparatus assembly of the invention in conjunction with an explosive charge for generating seismic waves;

FIG. 2 shows an alternative form of detonator for use in the assembly of FIG. 1 and FIG. 3 is a schematic diagram of a current sensing device for the circuit of FIG. 1.

In FIG. 1 an electric detonator casing 1 is located in a pocket 2 in a cylindrical explosive charge 3. The resistive bridgewire 4 is electrically connected at its terminals to the ends of a continuous leading wire 5 which is insulated with a coating of polyvinylchloride and has an intermediate portion wound as a secondary winding around a toroidal transformer core 6. The bridgewire 4 is embedded in matchhead composition 7 as in a conventional electric fusehead assembly. The detionator contains a primary charge 8 and base charge 9.

An electric generator 10 is connected in series with an electric sensing device 11 by a circuit of insulated conductor wire 12 whih is looped into transformer core 6 as a primary winding, the portion of the circuit forming the primary winding being sufficiently close to the explosive charge 3 to be broken when the charge explodes. The transformer core 6 is located in a hollow space formed in a protective plastics cap 13 on top of the explosive charge.

The sensing device 11 is connected to a seismic recorder 14 to mark the time-break on for example magnetic tape or photographic paper when the circuit through conductor wire 12 is broken.

In operation, a high frequency current (for example 15 KHz) is generated by generator 10 which is sufficiently strong and at the correct frequency determined by the transformer core characteristics to induce a current in the secondary winding on the core and ignite the matchhead composition 7, which in turn ignites the explosive charge 3 in the conventional manner.

The current continues to flow in the conductor wire 12 after the ignition of the composition 7 and breaking of the detonator circuit and only ceases when the circuit 12 is broken by the explosion of the charge 3. When the current in the conductor wire 12 ceases a signal is passed from sensing device 11 to the recorder 14 and the time-break is marked on the record. The subsequent signals from geophones in response to the reflected or refracted seismic waves are subsequently recorded on the seismic record in the usual manner.

The current sensing device 11 shown in FIG. 3 is appropriate for sensing a high frequency current in the conductor wire 12. The device comprises a toroidal transformer core 15 through which a single turn of the conductor wire 12 is looped as a primary winding. A secondary winding 16 on the toroidal core 15 is connected to a rectifier circuit comprising a rectifier diode 17, a current limiting resistor 18 and a voltage controlling zener diode 19. The rectifier circuit is connected to charge a capacitor 20, which has a discharge resistor 21 connected therewith to control the rate of decay of the capacitor discharge. The capacitor voltage is fed to a voltage comparator 22, suitably a high gain amplifying switching circuit, which is connected to a monostable multivibrator pulse generator 23. The output from the pulse generator 23 is connected to the recorder 14. A reference voltage is also fed to the comparator 22.

While current flows in conductor wire 12 capacitor 20 is recharged by each current cycle to a voltage exceeding the reference voltage. The capacitor 20 and resistor 21 are chosen to give a discharge time constant of the capacitor 20 ($R \times C$) such that the capacitor voltage does not fall below the comparator reference level during one current cycle time, but will fall below the level within a time interval not greatly exceeding the time of one cycle. Thus when the current in conductor wire 12 ceases the voltage of capacitor 20 quickly falls below the reference voltage in comparator 22. In this condition the comparator provides an output which triggers the pulse generator 23 and a pulse is fed to the seismic recorder 14 to mark the time-break in the seismic record.

In the alternative detonator of FIG. 2 the bridgewire 4 is directly connected into the circuit of conductor wire 12 in series with the generator 10 and sensing device 11. A resistance element is shunt connected across the terminals of the bridgewire 4. The element is chosen so that is will not fuse when current is applied from the generator but will only break when the explosive charge explodes. Thus in operation current will continue to flow through the sensing device 11 after the bridgewire 4 breaks and until the element 15 is broken by the explosion of charge 3.

We claim:

1. A method of seismic recording wherein seismic waves are generated by firing an explosive charge by means of a detonator having an electrical ignition element and are subsequently recorded after reflection or refraction at subterranean rock layer interfaces, the said method comprising the steps of:

feeding firing energy from an A.C. energy source to said electric ignition element through a transformer which has a primary circuit connected to said A.C. source and a secondary circuit connected to said electric ignition element, said primary circuit having a breakable portion adapted and disposed so as to be ruptured by the explosion of said explosive charge;

detecting the time when the said breakable circuit portion is broken; and, in response thereto, making a mark on the seismic record to indicate a time-break on the record.

2. A method as in claim 1 wherein the breaking of the breakable circuit portion is detected by the cessation of current across the broken circuit portion.

3. An apparatus assembly for indicating a time-break on a record of a seismic signal generated by firing an explosive charge by means of a detonator having an electrical ignition element, said assembly comprising:

a transformer having a primary circuit for connection to an A.C. energy source and a secondary circuit for connection to said electric ignition element, said primary circuit having a breakable portion adapted to be ruptured by the explosion of said explosive charge;

and electrical sensing means adapted to generate a signal to mark a time-break on the said record in response to the rupture of said breakable circuit portion.

4. An assembly as claimed in claim 3 wherein the electrical sensing means comprises a current responsive device connected in series with the breakable electrical circuit, which device, on cessation of the current generates a signal to mark the time-break on the seismic record.

5. An assembly as claimed in claim 3 wherein the electrical sensing means comprises a transformer core to which the breakable circuit portion is electromagnetically coupled as a primary circuit, a secondary winding on said transformer core and a pulse detector to detect the presence and cessation of the pulses induced in the secondary winding when energy is passed through said breakable circuit portion from an A.C. source during the explosion of the charge.

6. An assembly as claimed in claim 5 wherein the pulse detector comprises a resistor-capacitor circuit connected via a rectifier to the said secondary winding whereby the capacitor is charged by induced pulses in the secondary winding, a voltage comparator to compare the capacitor voltage with a reference voltage and means responsive to the voltage comparator output to mark the time-break on the seismic record when the capacitor falls below the reference voltage.

* * * * *